United States Patent [19]

van Esdonk

[11] Patent Number: 4,645,966

[45] Date of Patent: Feb. 24, 1987

[54] DISPLAY TUBE WITH FLUID COOLED WINDOW

[75] Inventor: Johannes van Esdonk, Eindhoven, Netherlands

[73] Assignee: U.S. Philips Corporation, New York, N.Y.

[21] Appl. No.: 873,865

[22] Filed: Jun. 12, 1986

Related U.S. Application Data

[63] Continuation of Ser. No. 468,027, Feb. 18, 1983, abandoned.

[30] Foreign Application Priority Data

Mar. 19, 1982 [NL] Netherlands ........................ 8201136

[51] Int. Cl.[4] ........................ H01J 7/26; H01J 29/86; H04N 5/74

[52] U.S. Cl. ................................ 313/24; 313/477 R; 358/237

[58] Field of Search ..................... 313/24, 477 R, 478, 313/44, 46; 358/237, 247, 250

[56] References Cited

U.S. PATENT DOCUMENTS

| | | | |
|---|---|---|---|
| 2,093,288 | 9/1937 | Ogloblinsky | 358/250 X |
| 2,241,974 | 5/1941 | Anderson et al. | 313/477 X |
| 2,655,452 | 10/1953 | Barnes et al. | 358/247 X |
| 3,299,949 | 1/1967 | Beurtheret | 313/44 X |
| 3,422,298 | 1/1969 | DeGier | 313/478 |
| 4,405,949 | 9/1983 | Hockenbrock et al. | 358/237 |

*Primary Examiner*—Palmer C. DeMeo

*Assistant Examiner*—Sandra L. O'Shea

*Attorney, Agent, or Firm*—John C. Fox

[57] ABSTRACT

A display window (11) of a display tube is manufactured from a plate (21) having grooves (22), which plate is fused to a plate (20), so that ducts (25) are present in the display window (11). The phosphor screen (14) is provided on the inside of plate (20). The ducts (25) communicate at one end with a common supply duct (26) having an inlet aperture (27) and communicate at the other end with a common exhaust duct (28) having an outlet aperture (29). A coolant is forced through the ducts (25) for cooling the phosphor screen (14).

9 Claims, 6 Drawing Figures

DISPLAY TUBE WITH FLUID COOLED WINDOW

This is a continuation of application Ser. No. 468,027, filed Feb. 18, 1983, now abandoned.

BACKGROUND OF THE INVENTION

The invention relates to a display tube comprising a glass envelope having a substantially rectangular display window provided with a phosphor screen, in which window means are present at a short distance from the phosphor screen to cool the screen with a coolant.

Such a display tube is known from German Patent Specification 693,187. During operation of the tube the display window is scanned by an electron beam which causes the phosphor screen to luminesce. However, as a result of the electron bombardment the temperature of the phosphor screen rises so that the luminous efficiency of the phosphor screen decreases. This is the case in particular in display tubes for projection television in which the phosphor screens are scanned by electron beams having large beam currents so as to obtain the required high brightness of the phosphor screens. In order to counteract the decrease of the luminous efficiency it is known to cool the display window and hence the phosphor screen. In the known display tube a meander-like glass cooling tube is provided in the display window at a short distance from the phosphor screen. The display window is manufactured by placing the cooling tube on a thin substrate and then embedding the cooling tube in glass. A gaseous or liquid coolant is passed through the cooling tube.

However, the cooling obtained in this manner is poor, since only a restricted quantity of coolant can be forced through the meander-like cooling tube due to the high flow impedance. Furthermore, for the manufacture of the known display window, various types of glass of different melting-points are necessary which consequently also have different refractive indices. For example, the glass of the cooling tube must have a higher melting-point than the glass in which the cooling tube is embedded. As a result of this, the glass of the cooling tube and the moulded glass will have different refractive indices, so that the cooling tube will be visible. The glass of the thin substrate must also have a higher melting-point than the moulding glass. Moreover, the cooling tube and the glass in which the cooling tube is embedded also have different coefficients of expansion, which may cause stresses in the display window which may lead to fracture of the tube.

SUMMARY OF THE INVENTION

It is therefore the object of the invention to provide a display tube having cooling means, with which the phosphor screen can be cooled in a more efficient manner and which can be manufactured in a simple manner. For that purpose, a display tube of a kind mentioned in the opening paragraph is characterized according to the invention in that the display window is formed by two glass plates which are fused together and in that the cooling means is formed by grooves provided in one of the plates on the side facing the other plate, which grooves extend substantially parallel to one of the rectangular sides of the display window and one end of which communicate with a common supply duct and the other end of which communicates with a common exhaust duct for the coolant. The grooves can simply be pressed or etched in one of the plates. By fusing the two plates the grooves are formed into ducts. A large quantity of coolant can be forced through the ducts by the common supply duct and exhaust duct, so that the phosphor screen can be efficiently cooled.

A first embodiment of a display tube in accordance with the invention is characterized in that the grooves are substantially trapezoidal in a cross-section at right angles to the longitudinal direction. A second embodiment is characterized in that the grooves are substantially sinusoidal in a cross-section at right angles to the longitudinal direction. With either of these grooves shapes, the risk of light being emanated from upright walls of grooves at right angles to the glass surface causing optical distortion is avoided.

A third embodiment is characterized in that the coolant has a refractive index which is equal to the refractive index of the glass plate which is provided with grooves. Because of this the grooved plate and the coolant optically form one assembly. The other plate may have a refractive index which differs from the grooved plate and the coolant, because two flat parts secured together having different refractive indices do not cause optical distortion.

A fourth embodiment is characterized in that the plate on which the phosphor screen is provided is manufactured from X-ray-transmissive glass and the other plate is manufactured from X-ray-absorbing glass. X-ray-absorbing glass discolours as a result of the electron bombardment, so that for projection tubes the display window is often manufactured from non-X-ray-absorbing glass but an X-ray-absorbing glass plate is placed in front of the display window. Since the display window in a tube in accordance with the invention is composed of two plates, the construction can be simplified. The plate on which the phosphor screen is provided is manufactured from X-ray-transmissive and hence non-discolouring glass. The other plate is manufactured from X-ray-absorbing glass which does not discolour because no electrons impinge on this plate. A further embodiment is characterized in that the other plate forms a lens. The other plate may advantageously form part of a system of lenses for projecting the picture.

A fifth embodiment is characterized in that the plate on which the phosphor screen is provided is manufactured from grey-tinted glass. Herewith a larger contrast of the picture is obtained.

A sixth embodiment is characterized in that the phosphor screen is formed by phosphors luminescing in at least one colour. The display tube may be constructed as a monochromic tube and also as a colour tube.

A display tube in accordance with the invention is generally suitable for those applications in which high brightness is required, and is particularly suitable for a projection television device which has one or several display tubes for projecting the pictures onto a screen by means of a system of lenses.

BRIEF DESCRIPTION OF THE DRAWING

The invention will now be described in greater detail, by way of example, with reference to the accompanying drawing, in which.

DESCRIPTION OF THE PREFERRED EMBODIMENTS

Figure 1:
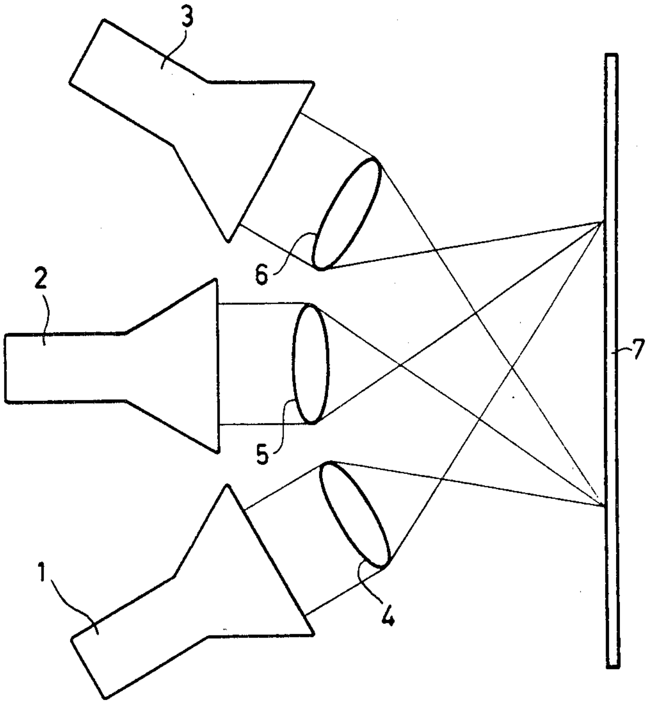
FIG. 1 is a diagrammatic plan view of a projection television device having display tubes according to the invention.

FIG. 1 is a diagrammatic plan view of a projection television device having display tubes according to the invention. The device comprises three monochromic display tubes 1, 2 and 3, by which red, green and blue pictures, respectively, are generated. The three monochromic pictures are projected on the screen 7 by means of the lenses 4, 5 and 6, in such manner that the three pictures overlap each other. A coloured picture is then observed on the screen 7.

Figure 2:
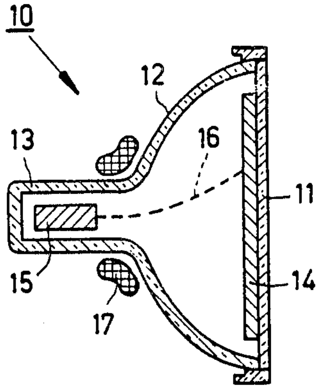
FIG. 2 is a diagrammatic sectional view of a tube shown in FIG. 1.

FIG. 2 is a cross-sectional view of a display tube shown in FIG. 1. The display tube 10 comprises a glass envelope which is formed by a diagrammatically shown display window 11 having a substantially rectangular shape and a cone 12 having a neck 13. On the inside of the display window 11 a phosphor screen 14 is provided. An electron gun 15 for generating an electron beam 16 is disposed in the neck 13. By means of a system of deflection coils 17 placed around the tube 10, the electron beam 16 which is modulated by video information is deflected over the phosphor screen 14 according to a raster of substantially parallel lines. As a result of this the phosphor screen is made to luminesce. In order to obtain a reasonable brightness of the projected picture, each tube 10 should have a sufficient brightness. For this purpose it is necessary for the phosphor screen 14 to be cooled. Cooling of the phosphor screen 14 is carried out by cooling the display window 11.

Figure 3A:
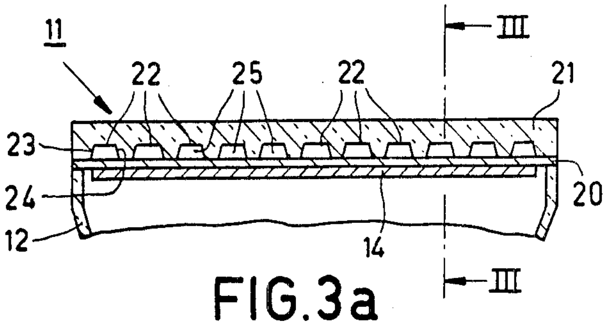
FIG. 3*a* shows in detail the construction of the display window of the tube of FIG. 2.
Figure 3B:
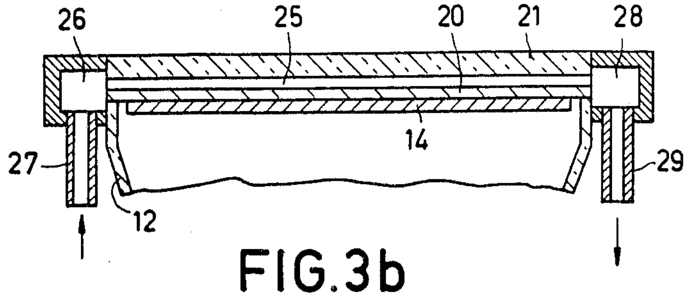
FIG. 3*b* is a sectional view taken on the line III—III in FIG. 3*a*.
Figure 4:
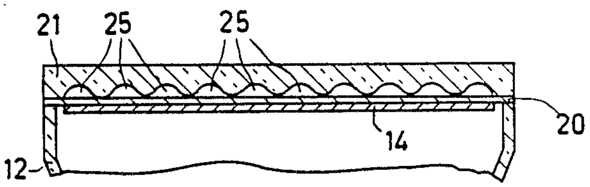
FIG. 4 is a sectional view of a display window of another embodiment of a tube in accordance with the invention.

FIG. 3*a* shows the construction of the display window 11 in greater detail. The display window 11 is formed by a glass plate 20 having a thickness of approximately 1 mm which is fused to a glass plate 21 having a thickness of approximately 6 mm. A large number of grooves 22 are pressed in the glass plate 21 and extend parallel to a rectangular side of the plate 21. Of course, the grooves 22 may also be etched in the plate 21. The grooves are, for example 2 mm deep and approximately 1 mm wide and are present at a pitch of 2 mm. By fusing the plate 20 to the plate 21, the grooves 22 are covered and ducts 25 are formed. FIG. 3*b* is a sectional view taken on the line III—III of FIG. 3*a*. The ducts 25 communicate at one end with a common supply duct 26 having an inlet aperture 27, and communicate at the other end with a common exhaust duct 28 having an outlet aperture 29. The ducts 27 and 28 are glued against the sides of the tube. The ducts 27 and 28 may alternatively be pressed partly during pressing the glass plate 21. The coolant used is a liquid whose refractive index is equal to the refractive index of the glass plate 21. As a result of this, the coolant optically forms one assembly with the plate 21. The plate 20 preferably has the same refractive index as the plate 21. However, the plate 20 may also have a different refractive index, because this does not cause any picture distortion. The ducts 25 have a trapezoidal cross-section (see FIG. 3*a*). The walls 23 and 24 are at an inclined angle with the surface of the glass plates 20 and 21, thereby preventing these walls 23 and 24 from causing distortion of the picture. If upright walls of grooves extending at right angles to the surface were provided, the light emanating from these walls could cause distortion of the picture. Another embodiment of a display window in which this is also prevented is shown in FIG. 4 which is a sectional view of the display window. The same components are referred to by the same reference numerals as in FIG. 3*a*. The difference between the embodiment of FIGS. 3*a* and 3*b* is that the ducts 25 are not trapezoidal but are substantially sinusoidal. Of course, other shapes of the ducts are also possible in addition to the shapes shown.

In the embodiments shown, the plate 20 is preferably of an X-ray-transmissive glass, so that the plate 20 does not discolour as a result of the electron bombardment. The plate 20 may be manufactured from grey-tinted glass with which a better contrast is obtained. The plate 21 is of X-ray-absorbing glass which does not discolour because no electrons impinge upon the plate 20.

Figure 5:
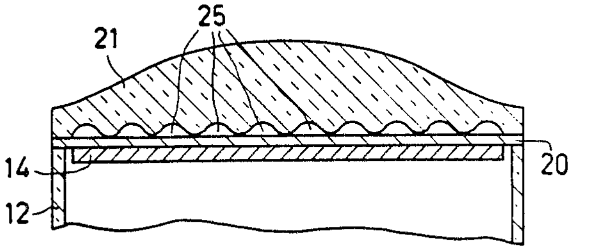
FIG. 5 is a sectional view of a display window of still another embodiment of a tube in accordance with the invention.

A further embodiment will be described in greater detail with reference to FIG. 5 which is a sectional view of the display window. The same components are referred to by the same reference numerals as in FIG. 4. The plate 21 in this case advantageously forms the first lens of the system of lenses for projecting the picture. As a result of this the depth of the tube with the system of lenses can be reduced.

What is claimed is:

1. A display tube comprising a glass envelope having a substantially rectangular display window supporting a luminescent screen and including a cooling arrangement for transferring heat away from the screen, said cooling arrangement comprising:

(a) first and second substantially rectangular transparent plates having facing sides with substantially flat surfaces, the facing side of the first plate including a plurality of longitudinally oriented grooves extending into said flat surface, the facing sides of said plates being in substantial contact with each other and being sealed together to form the display window, whereby each groove of the first plate forms a separate conduit with the facing surface of the second plate for carrying a coolant;

(b) coolant supply means attached to one end of the display window for supplying the coolant to respective ends of the conduits; and (c) coolant receiving means attached to another end of the display window for receiving the coolant from respective ends of the conduits.

2. A display tube as in claim 1, characterized in that the grooves are substantially trapezoidal in a cross-section at right angles to the longitudinal direction.

3. A display tube as in claim 1, characterized in that the grooves are substantially sinusoidal in a cross-section at right angles to the longitudinal direction.

4. A display tube as in claim 1, characterized in that the conduits are filled with a coolant having a refractive index which is substantially equal to the refractive index of the first plate.

5. A display tube as in claim 1, characterized in that one of said plates supports the luminescent screen and consists essentially of X-ray-transmissive glass, and that the other plate consists essentially of X-ray-absorbing glass.

6. A display tube as in claim 1, characterized in that one of said plates supports the luminescent screen and the other plate forms a lens.

7. A display tube as in claim 1, characterized in that one of said plates supports the luminescent screen and consists essentially of gray-tinted glass.

8. A display tube as in claim 1, characterized in that the luminescent screen consists essentially of phosphors luminescing in at least one color.

9. A projection television device including at least one display tube comprising a glass envelope having a substantially rectangular display window supporting a luminescent screen and including a cooling arrangement for transferring heat away from the screen, said cooling arrangement comprising:

(a) first and second substantially rectangular transparent plates having facing sides with substantially flat surfaces, the facing side of the first plate including a plurality of longitudinally oriented grooves extending into said flat surface, the facing sides of said plates being in substantial contact with each other and being sealed together to form the display window, whereby each groove of the first plate forms a separate conduit with the facing surface of the second plate for carrying a coolant;

(b) coolant supply means attached to one end of the display window for supplying the coolant to respective ends of the conduit; and (c) coolant receiving means attached to another end of the display window for receiving the coolant from respective ends of the conduits.

* * * * *